Figure 1:
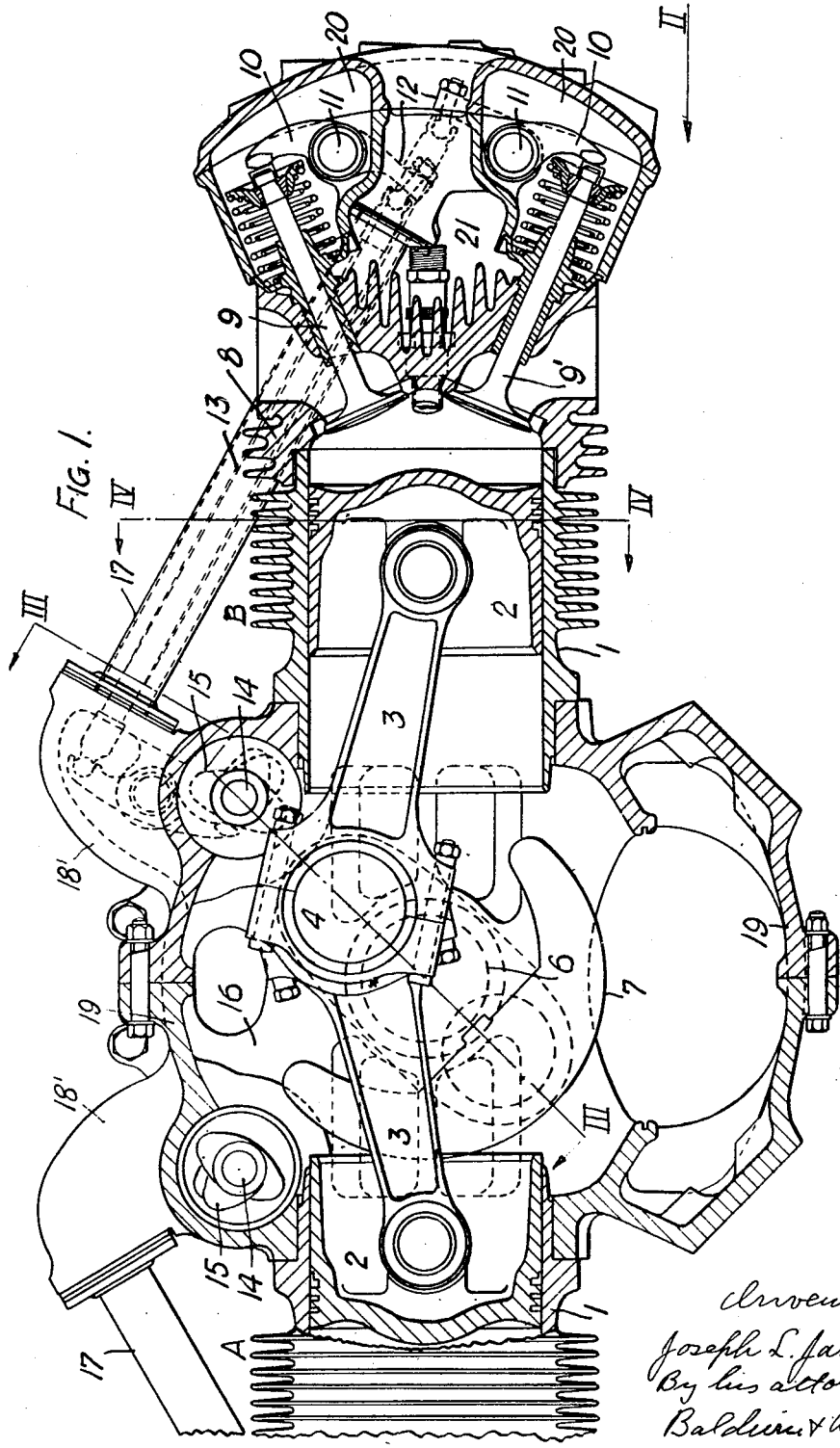

July 18, 1950 J. L. JAMESON 2,515,347
VALVE GEAR FOR INTERNAL-COMBUSTION ENGINES
Filed Nov. 30, 1945 3 Sheets-Sheet 2
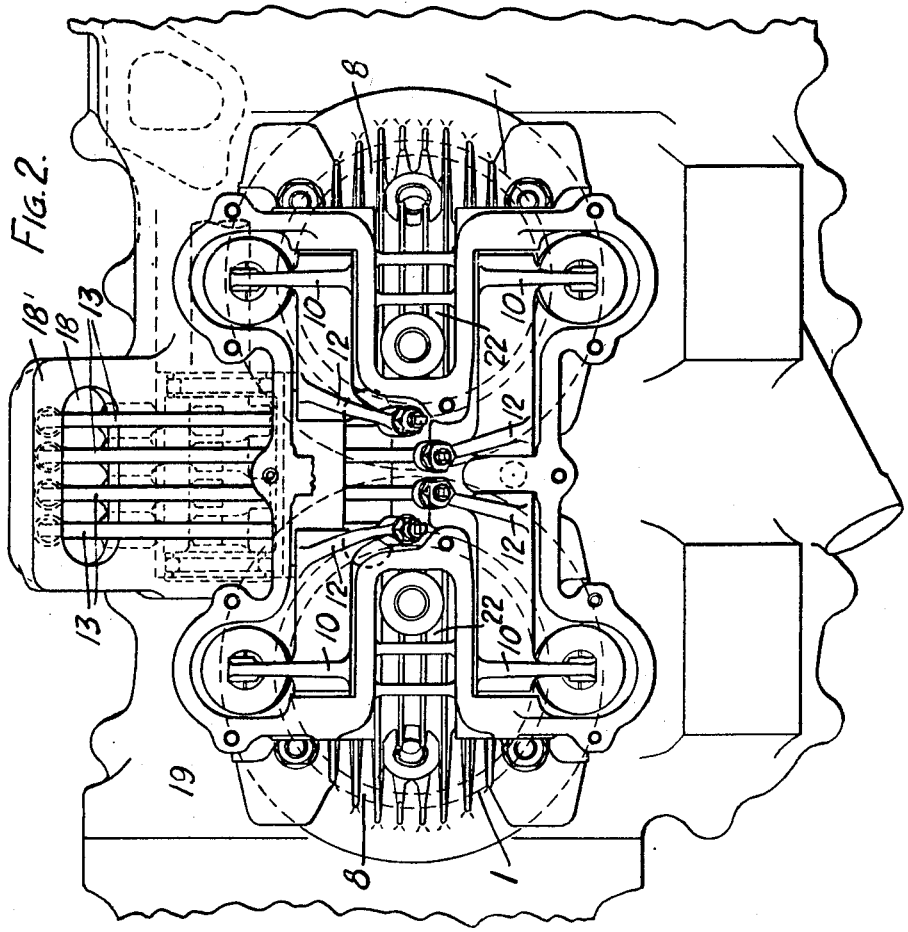
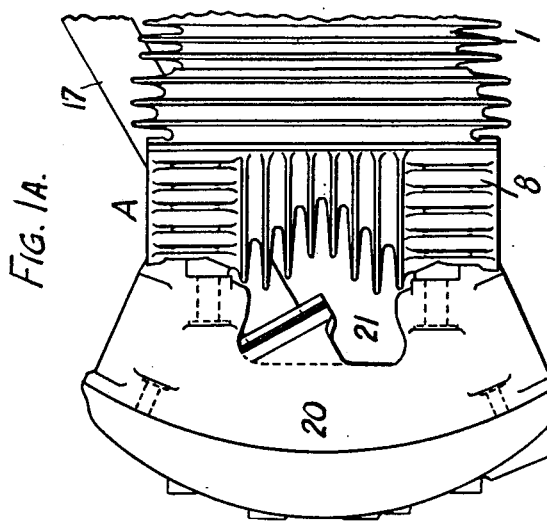
Inventor:
Joseph L. Jameson
By his attorneys,
Baldwin & Wight July 18, 1950 J. L. JAMESON 2,515,347
VALVE GEAR FOR INTERNAL-COMBUSTION ENGINES
Filed Nov. 30, 1945 3 Sheets-Sheet 3
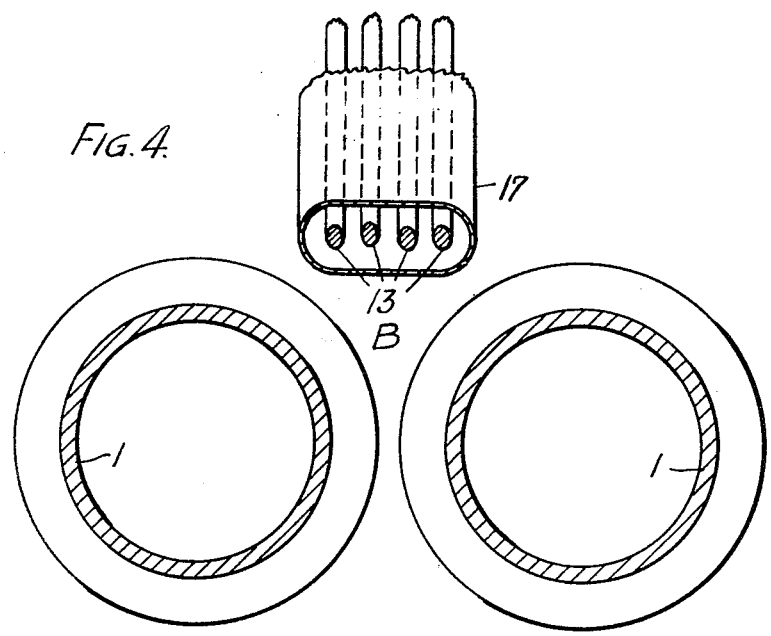
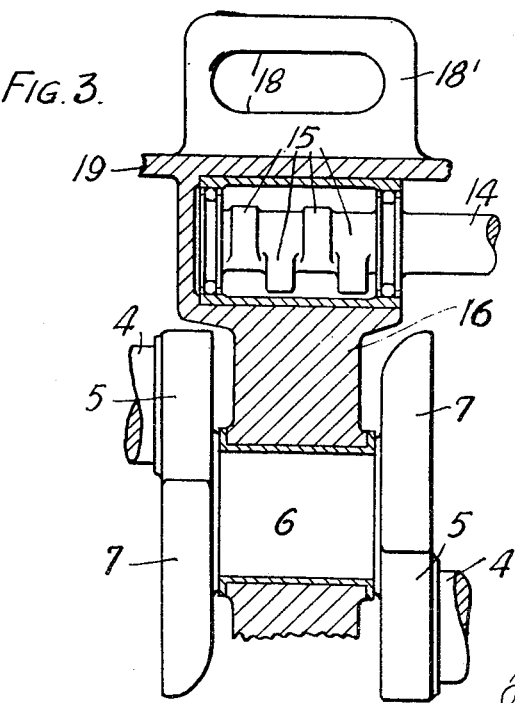
Inventor
Joseph L. Jameson
By his attorneys,
Baldwin & Wight Patented July 18, 1950

2,515,347

UNITED STATES PATENT OFFICE 2,515,347

VALVE GEAR FOR INTERNAL-COMBUSTION ENGINES

Joseph Lambert Jameson, Ewell, England

Application November 30, 1945, Serial No. 631,882
In Great Britain March 28, 1944

Section 1, Public Law 690, August 8, 1946
Patent expires March 28, 1964

3 Claims. (Cl. 123—90)

This invention relates to improvements in valve gear for air cooled multi-cylinder internal combustion engines of the reciprocatory piston and crank type and having opposed banks of cylinders in line one behind another and having overhead valve mechanism.

One object of this invention is to provide such an engine with a valve-operating mechanism which shall be so arranged as to provide a compact power unit.

A further object of the invention is to provide an arrangement of parts which will promote efficient circulation of cooling air.

A still further object is to provide such a disposition of valve operating mechanism as shall be conveniently grouped and disposed for inspection and maintenance.

The present invention consists in providing an internal combustion engine which comprises two horizontally opposed cylinder banks, each bank having two cylinders in line and spaced apart to provide a gap for cooling air flow, an overhead inlet and an overhead outlet valve for each cylinder, rocker mechanism for the valves of each bank and having operated parts extending into the gap between the two cylinders of the bank, a valve-operating cam assemblage disposed at the adjacent ends of the opposed banks and disposed also to one side of the plane containing the axes of the opposed cylinders and between those axes and transmission members grouped respectively to extend in opposite directions from the cam assemblage and into the gap for operative association with the operated parts of the rocker mechanism of the respective bank. The valve operating cam assemblage would be disposed in the crank case of the engine and the rocker mechanism of each bank of cylinders would be contained within a first enclosure and the transmission members would be grouped in a second enclosure passing from the crank case to the first enclosure. Preferably the cam assemblage is disposed between the planes of the adjacent webs or arms of the crank shaft of the engine and it is preferred to mount the assemblage in the center bearing of the shaft.

Not only does this arrangement provide a convenient assembly and disposition of the parts but also it enables the adjacent cylinders to be spaced to ensure an ample flow of cooling air between the cylinders without waste of space.

The invention can obviously be applied to an engine consisting of more than one pair of cylinders in line in each opposed bank, a cam arrangement being disposed as described between the planes swept out by the adjacent arms of the cranks of the different opposed banks of cylinders.

The invention is illustrated in the accompanying drawings in which Figures 1 and 1a together constitute a sectional elevation of a horizontally opposed engine having two banks of cylinders, Figure 2 an elevation looking in the direction of the arrow II Figure 1 but with certain parts removed and Figures 3 and 4 are detail views, Figure 3 being a section the line III—III Figure 1 and Figure 4 a section on the line IV—IV Figure 1.

Referring to the drawings, the engine shown is arranged to operate on the four-stroke cycle; it comprises four separate cylinders arranged in two banks A and B in horizontal opposition and each bank consisting of two cylinders in line and spaced apart. The pistons 2 of the opposed cylinders 1 are coupled by connecting rods 3 to common crank pins 4 on crank webs 5 on a crank shaft 6 which is disposed between the opposed pairs of cylinders 1, the crank being balanced by balance weight extensions 7.

Each cylinder 1 has its own detachable cylinder head 8 in which are mounted inlet and exhaust valves 9, 9' respectively and these valves are operated through rocker arms 10 on rocker shafts 11 which also have rocker arms 12 to cooperate with the ends of push rods 13.

For the purpose of operating these push rods 13 there is provided for each pair of cylinders in line a single cam shaft 14 having cams 15 which, as shown in Figure 3, are grouped so that they are disposed above and centrally about the two cylinders 1 of the appertaining pair of cylinders, the corresponding push rods 13 being, as is shown in Figures 2 and 4 grouped so as to pass from the rocker arms 12 through the space left by the spacing of the pair of cylinders as is seen from Figure 4.

As is seen from Figure 3, the cams 15 are arranged to lie between the planes containing the adjacent faces of the crank webs 5.

It will now be seen that the arrangement of this invention has a two-fold advantage; it is desirable to space apart the cylinders 1 so as to provide for the adequate flow of cooling air between them; this of course causes space to be taken up but this space is usefully occupied by the valve operating gear.

The arrangement enables the cam shaft 14 to be journalled in the body 16 of the central bearing for the crank shaft 6 as is seen from Figure 3 and thus the whole lay-out is one which makes good use of space which is necessarily provided and which ensures adequate cooling of the cylinders and by reason of the grouping of the push rods at the upper side of the cylinder, an accessible arrangement is provided.

The push rods are housed in housings 17 in which they are grouped, and the housing is secured at one end about an opening 18 formed in an extension 18' of the crank-case 19 of the engine and at the other end about an opening in a valve case 20 secured to the cylinder heads 8; this case 20 is of itself of arch form rising from the points of connection to the cylinder heads so as to provide a clear opening 21 for the flow of air across the heads 8, the case being, as seen in Figure 2, recessed at 22 so as to shroud closely the rocker shafts 11 to increase the free surface exposed to cooling air flow.

Drive to the cam shaft or shafts can be effected in any convenient manner and in the arrangement shown the cam shaft 14 is extended to one end of the crank-case and is there provided with a gear geared to the crank-shaft.

The crank shaft itself may however be provided with a gear between the crank webs and in direct mesh with a gear on the cam block; to accommodate the gear, the crank-shaft bearing can be formed in two lengths with the gears between them or the gears can be disposed at the end of the bearing.

What I claim is:

1. An internal combustion engine comprising two horizontally opposed cylinder banks, each bank having two cylinders in line and spaced apart to provide a gap for cooling air flow, an overhead inlet and an overhead outlet valve for each cylinder, rocker mechanism for the valves of each bank and having operated parts extending into the gap between the two cylinders of the bank, a valve-operating cam assemblage disposed at the adjacent ends of the opposed banks and disposed also to one side of the plane containing the axes of the opposed cylinders and between those axes and transmission members grouped perspectively to extend in opposite directions from the cam assemblage and into the gap for operative association with the operated parts of the rocker mechanism of the respective bank.

2. An internal combustion engine comprising a crank-case from which extend two horizontally opposed cylinder banks, each having two cylinders in line and spaced apart to provide a gap for cooling air, each cylinder having overhead divergent inlet and outlet valves, rocker mechanism for the valves of each bank, the said rocker mechanism being disposed beyond the heads of the cylinders and having operated parts which extend into the gap between the cylinders of the bank, a valve operating cam assemblage disposed in the crank-case to one side of the plane containing the axes of the opposed cylinders, a first enclosure housing the rocker mechanism of each bank and the valve stems of the valves and being arched over the cylinder heads, transmission members grouped respectively to extend in opposite directions from the cam assemblage and into the gap for operative association with the operated parts of the rocker mechanism of the respective bank, and a second enclosure housing the said transmission members between the said first enclosure and the crank-case.

3. An internal combustion engine comprising two horizontally opposed cylinder banks, each bank having two cylinders in line and spaced apart to provide a gap for cooling air flow, a two-throw crank shaft, pistons in the cylinders, connecting rods connecting pistons of one or other bank to the two-throw crank, overhead inlet and overhead outlet valves for each cylinder, rocker mechanism for the valves of each cylinder and having operated parts extending into the gap between the two cylinders of each bank, a valve operating cam assemblage mounted in the center bearing for the crank shaft, the said assemblage being disposed to one side of the plane containing the axes of the opposed cylinders, and transmission members grouped respectively to extend in opposite directions from the cam assemblage and into the gap for operative association with the operated parts of the rocker mechanism of the respective bank.

JOSEPH LAMBERT JAMESON.

REFERENCES CITED

The following references are of record in the file of this patent:

UNITED STATES PATENTS

| Number | Name | Date |
| --- | --- | --- |
| 961,938 | Darracq | June 21, 1910 |
| 1,231,572 | Davis | July 3, 1917 |
| 1,400,889 | Lucke | Dec. 20, 1921 |
| 2,226,595 | Swenson | Dec. 31, 1940 |

FOREIGN PATENTS

| Number | Country | Date |
| --- | --- | --- |
| 287,877 | Germany | Oct. 12, 1915 |
| 244,199 | Great Britain | Dec. 17, 1924 |